United States Patent
Saavedra

(10) Patent No.: US 7,964,984 B2
(45) Date of Patent: Jun. 21, 2011

(54) ELECTRIC POWER GENERATOR UTILIZING INTERMITTENT WIND

(76) Inventor: John A. Saavedra, Irmo, SC (US)

( * ) Notice: Subject to any disclaimer, the term of this patent is extended or adjusted under 35 U.S.C. 154(b) by 0 days.

(21) Appl. No.: 12/752,502

(22) Filed: Apr. 1, 2010

(65) Prior Publication Data

US 2010/0187830 A1   Jul. 29, 2010

(51) Int. Cl.
*F03D 3/02* (2006.01)
*F03D 5/06* (2006.01)
(52) U.S. Cl. .............................. 290/55; 290/44; 416/79
(58) Field of Classification Search ............... 290/42, 290/43, 44, 54, 55; 416/79, 83
See application file for complete search history.

(56) References Cited

U.S. PATENT DOCUMENTS

| | | | | |
|---|---|---|---|---|
| 961,705 A * | 6/1910 | Mathhews | ...... | 416/13 |
| 4,002,416 A * | 1/1977 | Axford | ...... | 417/330 |
| 4,124,182 A | 11/1978 | Loeb | | |
| 4,228,360 A | 10/1980 | Navarro | | |
| 4,239,974 A | 12/1980 | Swander | | |
| 4,348,594 A | 9/1982 | Lipfert | | |
| 4,476,397 A | 10/1984 | Lawson | | |
| 4,525,122 A * | 6/1985 | Krnac | ...... | 416/80 |
| 4,580,400 A * | 4/1986 | Watabe et al. | ...... | 60/398 |
| 4,595,336 A | 6/1986 | Grose | | |
| 5,009,571 A * | 4/1991 | Smith | ...... | 416/79 |
| 5,137,416 A | 8/1992 | Mohrman | | |
| 5,163,813 A * | 11/1992 | Schlenker | ...... | 415/4.2 |
| 5,272,378 A * | 12/1993 | Wither | ...... | 290/1 R |
| 5,324,169 A | 6/1994 | Brown | | |
| 5,548,956 A | 8/1996 | Price | | |
| 6,153,944 A | 11/2000 | Clark | | |
| 6,239,507 B1 * | 5/2001 | Douthit | ...... | 290/55 |
| 6,323,563 B1 | 11/2001 | Kallenberg | | |
| 6,409,467 B1 * | 6/2002 | Gutterman | ...... | 415/4.3 |
| 6,726,440 B2 * | 4/2004 | Pollard, V | ...... | 415/4.1 |
| 6,734,576 B2 * | 5/2004 | Pacheco | ...... | 290/55 |
| 6,809,432 B1 | 10/2004 | Bilgen | | |
| 7,023,104 B2 * | 4/2006 | Kobashikawa et al. | ...... | 290/42 |
| 7,045,912 B2 | 5/2006 | Leijon | | |
| 7,098,553 B2 * | 8/2006 | Wiegel et al. | ...... | 290/55 |
| 7,131,269 B2 * | 11/2006 | Koivusaari | ...... | 60/495 |
| 7,411,311 B2 * | 8/2008 | Tal-or | ...... | 290/53 |
| 7,427,173 B2 * | 9/2008 | Chen | ...... | 404/71 |
| 7,618,237 B2 * | 11/2009 | Lucas et al. | ...... | 416/119 |
| 7,759,813 B2 * | 7/2010 | Fujisato | ...... | 290/53 |
| 7,834,474 B2 * | 11/2010 | Whittaker et al. | ...... | 290/53 |
| 2008/0157526 A1 | 7/2008 | Davison | | |

FOREIGN PATENT DOCUMENTS

EP    1466090 B1    3/2007

* cited by examiner

*Primary Examiner* — Nicholas Ponomarenko
(74) *Attorney, Agent, or Firm* — Oliff & Berridge, PLC

(57) ABSTRACT

A power generating system for utilizing intermittent winds includes a panel having first and second major sides each adapted for reciprocating the panel when intermittent winds are present. The panel is pivotally mounted on a frame supporting the panel such that upon intermittent winds contacting the first and second major sides of the panel the panel reciprocates between upstream and downstream positions with respect to the intermittent winds. The system includes a power generating apparatus carried by the frame and adapted to actuate when the panel reciprocates such that power is generated for use by a power consuming, power storing, or power transmitting device.

15 Claims, 3 Drawing Sheets

ELECTRIC POWER GENERATOR UTILIZING INTERMITTENT WIND

TECHNICAL FIELD AND BACKGROUND OF THE INVENTION

The invention relates generally to a power generating system, and more particularly to a power generating system for utilizing intermittent wind.

Typical wind-energy systems are placed in locations known to have consistent natural winds. A typical windmill has a blade assembly that executes full rotations. Such systems are suited for harnessing the energy of consistently directional winds. They are not well suited for harnessing the energy of intermittent, spurious, or gusty winds.

The total surface area of a typical windmill is also relatively small. Long and complex blades constructed of expensive materials are developed to turn rapidly in hill top and sea side locations where strong winds are present. Tall and expensive towers are needed to elevate the blades to safely permit full rotation and to reach wind patterns far above the ground.

Typical windmills often kill bats and birds, especially migratory birds, and they generate unwelcome noise. They disrupt skylines and viewing vistas for which people have paid good money. They are limited in high winds because they have to be shut down in high winds to prevent their own damage.

Thus, typical systems for collecting energy from wind are not suited for use by individuals and small businesses. A typical wind-energy system has a large structure that is difficult to disassemble and move, and is therefore not suited for transportation and relocation. However, electric utility companies must give credit for any electricity a customer produces through a process known as net metering, and so an incentive is in place for even individuals to enter the power producing arena.

Importantly, typical available wind-energy systems are not suited for harnessing the energy of ground level winds despite that great energy resources are available at low altitudes. For example, the air movements created by passing vehicles along roadways represent an unused energy resource.

Therefore there is a need for an improved power generator utilizing intermittent winds.

BRIEF SUMMARY OF THE INVENTION

Therefore it is an object of the present invention to provide an electric power generator that utilizes intermittent winds.

These and other aspects of the invention are achieved by providing a power generating system adapted for utilizing intermittent winds including a panel having first and second major sides each adapted for reciprocating the panel when intermittent winds are present, the panel being pivotally mounted on a frame supporting the panel such that upon intermittent winds contacting the first and second major sides of the panel the panel reciprocates between upstream and downstream positions with respect to the intermittent winds. The system includes a power generating apparatus carried by the frame and adapted to actuate when the panel reciprocates such that power is generated for use by a power consuming, power storing, or power transmitting device.

According to another aspect of the invention, the power generating apparatus includes an electrical current generator adapted to produce electrical current when the panel reciprocates.

According to another aspect of the invention, the electrical current generator is a permanent-magnet alternator.

According to another aspect of the invention, the power generating apparatus includes first and second electrical current generators adapted to produce first and second electrical currents when the panel reciprocates in first and second directions.

According to another aspect of the invention, first and second resistors and first and second capacitors are connected to outputs of the first and second electrical current generators and adapted to convert AC currents from the first and second electrical current generators into DC currents.

According to another aspect of the invention, rectifiers are connected to the outputs of the electrical current generators to convert AC currents to DC currents.

According to another aspect of the invention, DC outputs of the first and second electrical current generators are joined in series.

According to another aspect of the invention, the first and second electrical current generators are permanent-magnet alternators.

According to yet other examples, the power generating apparatus includes any number of electrical current generators. In one example, the power generating apparatus includes only one electrical current generator. In another example, the power generating apparatus includes two electrical current generators. In yet another example, the power generating apparatus includes three electrical current generators, and so forth. Other examples include ten and more electrical generators.

According to another aspect of the invention, the power generating apparatus includes a pair of spaced electrical current generators, and wherein an enlarged pulley is connected to a shaft carried by the frame such that the shaft pivots as the panel reciprocates, and wherein a belt driven by the enlarged pulley turns the electrical current generators as the shaft pivots.

According to another aspect of the invention, a method of generating power from intermittent winds includes providing a power generating system adapted for utilizing intermittent winds. The system includes a panel having first and second major sides each adapted for reciprocating the panel when intermittent winds are present. The panel is pivotally mounted on a frame supporting the panel. Upon intermittent winds contacting the first and second major sides of the panel, the panel reciprocates between upstream and downstream positions with respect to the intermittent winds. The system further includes a power generating apparatus carried by the frame and adapted to actuate when the panel reciprocates such that power is generated. The method further includes the steps of positioning the power generating system in a location where intermittent winds are present, and using the generated power by a power consuming, power storing, or power transmitting device.

According to another aspect of the invention, the power generating apparatus includes an electrical current generator adapted to produce electrical current when the panel reciprocates.

According to another aspect of the invention, the electrical current generator is a permanent-magnet alternator.

According to another aspect of the invention, the power generating apparatus includes first and second electrical current generators adapted to produce first and second electrical currents when the panel reciprocates in first and second directions.

According to another aspect of the invention, the power generating system is positioned next to a roadway.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
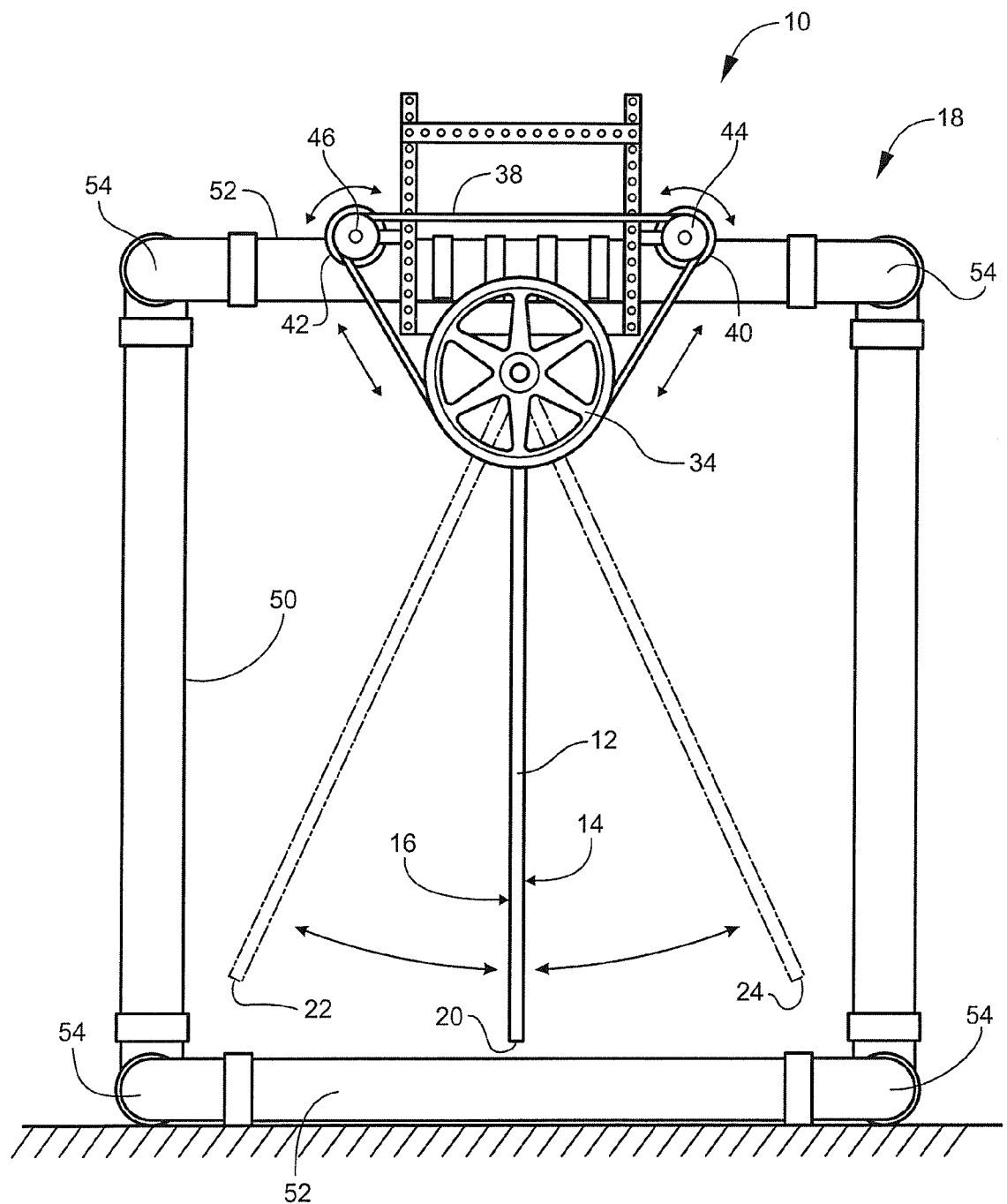
FIG. 1 is as side elevation view of a power generating system according to one embodiment of the present invention.
Figure 2:
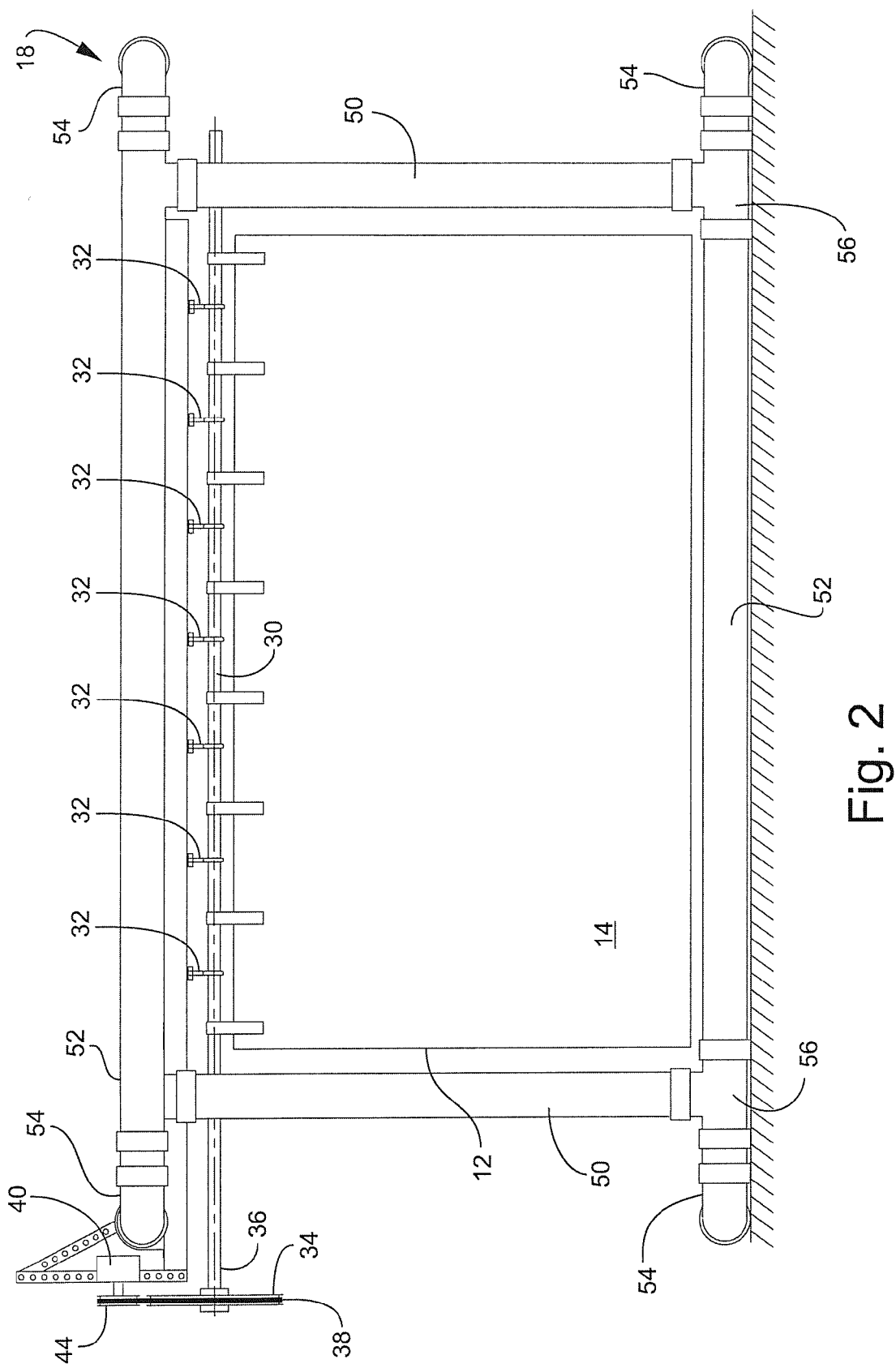
FIG. 2 is a front elevation view of the power generating system of FIG. 1.
Figure 3:
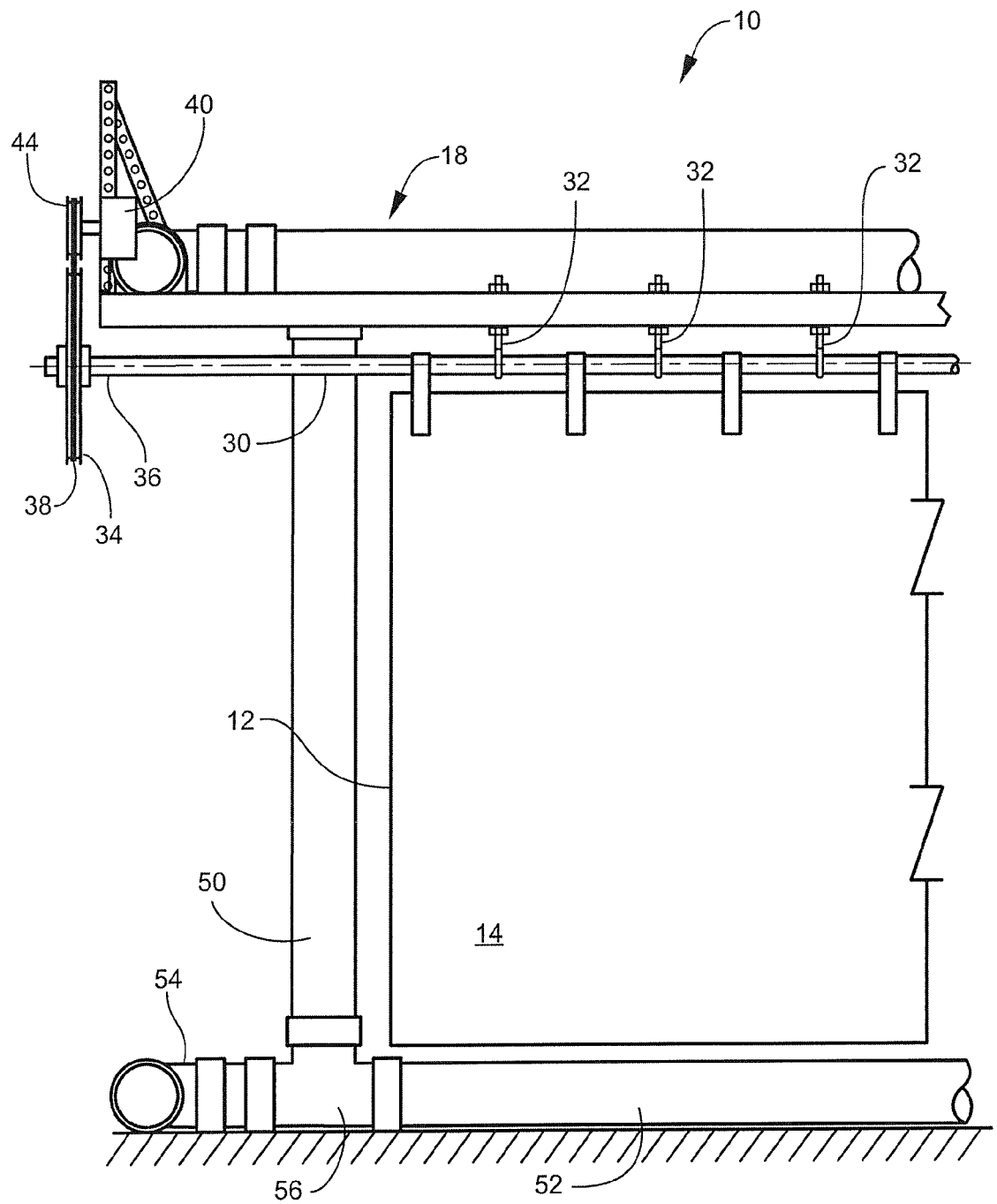
FIG. 3 is a partial cross-sectional view of the power generating system of FIG. 1.

Referring to the drawings wherein identical reference numerals denote the same elements throughout the various views, FIGS. 1-3 illustrate a power generating system 10, according to one embodiment of the present invention. The power generating system 10 is adapted for utilizing intermittent winds and can be positioned in a variety of locations where such winds are present. The power generating system 10 includes a panel 12 having first and second major sides 14 and 16. The panel 12 is pivotally mounted to a frame 18 to permit the panel 12 to reciprocate as best shown in FIG. 1 under the influence of winds.

Upon wind contacting the first major side 14, the panel 12 is moved by the wind from a vertical position 20 to a downstream position 22. When the wind contacting the first major side 14 has passed or lessens in strength, the panel 12 reciprocates from the downstream position 22, through the vertical position 20, and to an upstream position 24. The panel 12 is biased by gravity toward the vertical position 20. It therefore reciprocates between the downstream position 22 and the upstream position 24 until the energy from the wind on the first major side 14 is collected and utilized as described in the following.

Upon wind contacting the second major side 16, the panel 12 is moved by the wind from the vertical position 20 to the position 24, which corresponds to a downstream position with respect to the wind contacting the second major side 16. The panel 12 then reciprocates from the position 24 to the position 22, which corresponds to an upstream position with respect to the wind contacting the second major side 16. Thus, the positions 22 and 24 correspond nominally to upstream and downstream positions according to the direction of present winds.

The panel 12 may be made from any suitable material that can withstand the weather. In the illustrated example, the panel 12 is made from plywood but other suitable materials can be used. The panel 12 is preferably rigid or at least somewhat rigid so that it transfers wind motions to the shaft 30 as described below.

As shown in FIGS. 2 and 3, the panel 12 is mounted on a shaft 30, which is pivotally mounted on the frame 18 by connectors 32 that permit reciprocation of the panel 12 and the shaft 30. A pulley 34 is mounted on an end 36 of the shaft 30 that turns in two directions as the panel reciprocates as shown in FIG. 1. The pulley 34 drives a belt 38 that turns a pair of electrical current generators 40 and 42, each of which produces an electrical current when the panel 12 reciprocates. The electrical generators 40 and 42 have pulleys 44 and 46 by which the generators are driven by the belt 38. The pulley 34 mounted on the shaft 30 is enlarged with respect to the pulleys 44 and 46 of the electrical current generators 40 and 42 in the example shown in FIG. 1 so that the generators 40 and 42 rotate faster than the enlarged pulley 34 and turn in full rotations as the enlarged pulley 34 pivots with the panel 12 without fully rotating. In other examples, the pulleys 34, 44 and 46 can have other relative sizes.

The electrical current generators 40 and 42 can be permanent-magnet alternators or other suitable current generating devices. The electrical current generators may include resistors and capacitors adapted to convert AC currents to DC currents, or they may include rectifiers to convert AC currents to DC currents. DC outputs of the electrical current generators 40 and 42 may be joined in series. The pulleys 44 and 46 may be mounted to the electrical current generators 40 and 42 using one-way clutches so that the generators 40 and 42 turn in single directions as the panel 12 reciprocates in two directions. Thus, the power generating system 10 may be adapted to produce a DC output at a consistent polarity and amount whether the pulley 34 turns in a clockwise or counter clockwise direction. One-way clutches are optional and mentioned here as an example. They are not required in all examples of the invention.

In the illustrated example of the power generating system 10, two electrical power generators 40 and 42 are shown. However, any number of electrical power generators could be used. In one example, only one electrical power generator is used. In another example, three electrical power generators are used. In other examples, ten and more electrical power generators are used. Furthermore, the power generating system 10 may include gears and a gear box instead of the pulleys and belt that are shown in the drawings. Also, the power generating system 10 may include cams and/or elliptical gears coupling the movement of the panel to the one or more electrical power generators. The effective gear-ratio in such examples varies with the deflection of the panel 12. This would be suitable to harness winds of varying intensity and speed, and might be particularly useful when the panel 12 serves as a sign along a roadway. In such an example, it may be useful to limit the deflection of the panel 12 so that the information printed on the panel is readable to drivers. Suitable cams and/or elliptical gears would serve this purpose well by applying varying torques and turning speeds suitable for each situation as winds change. This would reduce the need for highway sign supporting structures to be engineered, designed and built to withstand hurricane-force winds, and instead would allow for limited, controlled reciprocal movement of signs to produce electricity. This lowers the initial build cost of the sign itself, and provides for the ongoing generation of power to illuminate the sign. The actual energy produced is dependent in large degree on the size of the planar surface of the panel 12, which is not limited by the drawings or descriptions here.

The parts of the power generating system 10 described thus far may be mounted on a pre-existing frame or support such as the frame of a roadway sign or other structure placed along a roadway, or they may be mounted on a dedicated structure such as the frame 18 shown in the figures. The frame 18 provided as an example in the figures includes tubular vertical and horizontal members 50 and 52 connected together at intersections by right-angle joints 54 and T-shaped joints 56. In the illustrated example, the frame components are made of PVC, but other suitable materials may be used.

The power generating system 10 is adapted for convenient placement wherever gusty and intermittent winds are found. Mounted upon the frame 18, the power generating system 10 is free standing and can be placed along a roadway, in the median of a highway, on the rooftop of a building, or at the end of an airport runway. The power generating system 10 can be surrounded by a wire mesh to prevent animals from getting injured or damaging a part of the system. The overall dimensions of the system 10 and the panel 12 can vary according to its use and location. For example, placed along a highway the panel 12 could be approximately 2 feet high and 50 or 100 feet long. The panel 12 could be placed parallel to the roadway to receive gusts from passing cars. These are examples only and do not restrict the invention in any way.

The power generated by the system 10 can provide power to equipment and facilities remote from other power sources. Thus it is suitable for use in powering remote monitoring systems such as weather monitoring systems, seismic activity monitoring equipment, pipeline monitors, systems that measure water levels and detect contaminants, remote radioactivity detection systems, and more. The power generating system 10 can power broadcast towers on mountain tops, and security systems along territorial boundaries. Along roadways, the power generating system 10 can be used to power traffic cameras, ice-monitoring equipment, emergency call boxes, and the like. The power generating system 10 can be deployed in the extreme environments of mountain tops and arctic areas to power research facilities, emergency survival facilities, and communication equipment. The power generating system 10 can be particularly valuable useful in storm conditions when power demands are high and utility grid systems often fail.

The power generating system 10 can be used to charge one or more batteries or to directly power one or more appliances. It can also be used to charge batteries. Furthermore, the power generating system 10 can be used to generate power to sell to a power company with suitable metering to assure proper payment or credit from the power company.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A power generating system adapted for utilizing intermittent winds comprising:
   (a) a panel having first and second major sides each adapted for reciprocating the panel when intermittent winds are present, the panel being pivotally mounted on a frame supporting the panel such that upon intermittent winds contacting the first and second major sides of the panel the panel reciprocates between upstream and downstream positions with respect to the intermittent winds, and in the absence of intermittent wind the panel returns to a rest position between the upstream and downstream position; and
   (b) a power generating apparatus carried by the frame and adapted to actuate when the panel reciprocates such that power is generated for use by a power consuming, power storing, or power transmitting device.

2. A power generating system according to claim 1, wherein the power generating apparatus comprises an electrical current generator adapted to produce electrical current when the panel reciprocates.

3. A power generating system according to claim 2, wherein the electrical current generator comprises a permanent-magnet alternator.

4. A power generating system according to claim 1, wherein the power generating apparatus comprises first and second electrical current generators adapted to produce first and second electrical currents when the panel reciprocates in first and second directions.

5. A power generating system according to claim 4, wherein outputs of the first and second electrical current generators are joined in series.

6. A power generating system according to claim 4, wherein the first and second electrical current generators comprise first and second permanent-magnet alternators.

7. A power generating system according to claim 1, wherein the power generating apparatus comprises a pair of spaced electrical current generators, and wherein an enlarged pulley is connected to a shaft carried by the frame such that the shaft pivots as the panel reciprocates, and wherein a belt driven by the enlarged pulley turns the electrical current generators as the shaft pivots.

8. A method according to claim 1, wherein the power generating apparatus comprises first and second electrical current generators adapted to produce first and second electrical currents when the panel reciprocates in first and second directions.

9. A power generating system according to claim 1, wherein the rest position of the panel is substantially vertical.

10. A power generating system according to claim 1, wherein the power generating apparatus is adapted to actuate via a transmission system connecting a pivot axis of the frame and panel to the power generating apparatus.

11. A power generating system according to claim 10, wherein the transmission system is a belt drive.

12. A method of generating power from intermittent winds comprising:
   (a) providing a power generating system adapted for utilizing intermittent winds comprising:
      (i) a panel having first and second major sides each adapted for reciprocating the panel when intermittent winds are present, the panel being pivotally mounted on a frame supporting the panel whereby upon intermittent winds contacting the first and second major sides of the panel the panel reciprocates between upstream and downstream positions with respect to the intermittent winds, and in the absence of intermittent wind the panel returns to a rest position between the upstream and downstream position; and
      (ii) a power generating apparatus carried by the frame and adapted to actuate when the panel reciprocates such that power is generated;
   (b) positioning the power generating system in a location where intermittent winds are present; and
   (c) using the generated power by a power consuming, power storing, or power transmitting device.

13. A method according to claim 12, wherein the power generating apparatus comprises an electrical current generator adapted to produce electrical current when the panel reciprocates.

14. A method according to claim 13, wherein the electrical current generator comprises a permanent-magnet alternator.

15. A method according to claim 12, wherein the power generating system is positioned next to a roadway.

* * * * *